United States Patent
Li et al.

(10) Patent No.: US 12,267,929 B1
(45) Date of Patent: Apr. 1, 2025

(54) AMBIENT LIGHTING DEVICE AND LIGHTING CONTROL METHOD THEREOF, AND STORAGE MEDIUM

(71) Applicant: Shenzhen Intellirocks Tech. Co., Ltd., Shenzhen (CN)

(72) Inventors: Qiang Li, Shenzhen (CN); Wenlong Wu, Shenzhen (CN)

(73) Assignee: Shenzhen Intellirocks Tech. Co., Ltd., Shenzhen (CN)

(*) Notice: Subject to any disclaimer, the term of this patent is extended or adjusted under 35 U.S.C. 154(b) by 0 days.

(21) Appl. No.: 18/927,408

(22) Filed: Oct. 25, 2024

(30) Foreign Application Priority Data

Nov. 7, 2023 (CN) .......................... 202311472375.3

(51) Int. Cl.
| | |
|---|---|
| H05B 47/00 | (2020.01) |
| F21S 4/20 | (2016.01) |
| F21V 33/00 | (2006.01) |
| G09G 3/34 | (2006.01) |
| H05B 47/11 | (2020.01) |
| H05B 47/155 | (2020.01) |
| H05B 47/165 | (2020.01) |

(Continued)

(52) U.S. Cl.
CPC ............... H05B 47/11 (2020.01); F21S 4/20 (2016.01); F21V 33/0052 (2013.01); H05B 47/155 (2020.01); H05B 47/17 (2020.01); H05B 47/19 (2020.01)

(58) Field of Classification Search
CPC ...... H05B 45/20; H05B 47/00; H05B 47/105; H05B 47/11; H05B 47/17; H05B 47/125; H05B 47/155; H05B 47/165; G09G 3/34; G09G 3/3413; G09G 3/2003; G09G 2360/08; G09G 2360/144; G09G 2360/16; G09G 2360/18
See application file for complete search history.

(56) References Cited

U.S. PATENT DOCUMENTS

| | | | | |
|---|---|---|---|---|
| 8,462,101 B2 * | 6/2013 | Han | ..................... | G09G 3/3406 |
| | | | | 345/690 |
| 11,871,494 B1 * | 1/2024 | Huang | ................... | H05B 45/20 |

(Continued)

FOREIGN PATENT DOCUMENTS

CN 116321627 A 6/2023

*Primary Examiner* — Thai Pham
(74) *Attorney, Agent, or Firm* — Wenye Tan

(57) ABSTRACT

A lighting control method is provided for an ambient lighting device having an ambient lamp including at least one lighting strip, which includes a plurality of lamp beads arranged into a display frame. The method includes starting the ambient lamp and a camera; reading preset frame configuration information, and dividing the display frame into a plurality of unit frames according to the frame configuration information; reading an environment reference image captured by the camera, and dividing the environment reference image into a plurality of regional images corresponding to the plurality of unit frames according to the frame configuration information; and generating a lighting color value corresponding to each lamp bead in each unit frame, based on a main color tone of the regional image corresponding to the unit frame, and controlling the corresponding lamp beads covered by the unit frame with the lighting color value to emit light.

18 Claims, 4 Drawing Sheets

(51) Int. Cl.
  *H05B 47/17* (2020.01)
  *H05B 47/19* (2020.01)

(56) References Cited

U.S. PATENT DOCUMENTS

| | | | |
|---|---|---|---|
| 2005/0041139 A1* | 2/2005 | Lowles | H04N 5/58 |
| | | | 348/E5.12 |
| 2020/0214102 A1* | 7/2020 | Lamanna | H04N 23/72 |
| 2022/0191996 A1* | 6/2022 | Huang | H05B 47/18 |

* cited by examiner

ABMIENT LIGHTING DEVICE AND LIGHTING CONTROL METHOD THEREOF, AND STORAGE MEDIUM

CROSS-REFERENCES TO RELATED APPLICATIONS

This application claims priority to Chinese Patent Application No. CN2023114723753, filed on Nov. 7, 2023, the content of which is hereby incorporated by reference in entirety.

FIELD OF THE TECHNOLOGY

The present disclosure relates to the technical field of lighting technology and, specifically, to an ambient lighting device and lighting control method thereof, and computer-readable storage medium.

BACKGROUND OF THE DISCLOSURE

As a kind of intelligent lamp, an ambient lamp can play the role of decorating atmosphere of the indoor space and displaying information. With the improvement of people's economic situations, the ambient lamp is becoming more and more popular. One of the functions of the ambient lamp is to, according to the light condition of the specified environment, generate a lighting effect corresponding to the light condition, so as to enhance the atmosphere of the environment. For example, the corresponding lighting effect can be generated according to the light of an image of the interface of a terminal device, or the corresponding lighting effect can be generated according to the light in the image of a specified physical space environment. In short, the ambient lamp can use an image as a reference to generate the corresponding lighting effect.

In practice, whether it is an image of the interface or a physical space, there are complex light changes. For example, according to the present disclosure, when the starry sky, lightning, shadows, etc., appear in the relevant scene, it will cause the relevant image to have a more complex color distribution, especially when the image is collected by a camera, which is more likely to have such a situation due to the limitation of the optical characteristics of the camera. Complex tones can easily mislead the ambient lamp to determine the lighting atmosphere, which often leads to inaccurate atmosphere rendering of the ambient lamp, etc., and cannot play a real role in shaping the atmosphere. Consumers obviously do not welcome this situation, so it is necessary to optimize this extreme situation accordingly to enhance the ability of the ambient lamp to flexibly create a welcoming lighting atmosphere.

The disclosed methods and apparatus are directed to solve one or more problems set forth above and other problems.

SUMMARY

Embodiments of the present disclosure provides an ambient lighting device and lighting control method thereof, and computer-readable storage medium.

According to one aspect of the present disclosure, a lighting control method is provided for an ambient lighting device. The method includes: starting an ambient lamp and a camera, wherein the ambient lamp includes at least one lighting strip, the lighting strip includes a plurality of lamp beads, and the plurality of lamp beads are arranged into a display frame; reading preset frame configuration information, and dividing the display frame into a plurality of unit frames according to the frame configuration information, such that each unit frame correspondingly covers multiple lamp beads in the ambient lamp; reading an environment reference image captured by the camera, and dividing the environment reference image into a plurality of regional images corresponding to the plurality of unit frames according to the frame configuration information; and generating a lighting color value corresponding to each lamp bead in each unit frame, based on a main color tone of the regional image corresponding to the unit frame, and controlling the corresponding lamp beads covered by the unit frame with the lighting color value to emit light. The generating the lighting color value corresponding to each lamp bead in each unit frame further includes: distinguishing dark-light pixels and non-dark-light pixels in the regional image according to a preset dark-light threshold; determining the lighting color value corresponding to the main color tone of the regional image according to a lighting color value of the non-dark-light pixels of the regional image; and generating the lighting color value corresponding to each lamp bead in the unit frame corresponding to the regional image according to the lighting color value corresponding to the main color tone.

According to another aspect of the present disclosure, an ambient lighting device is provided. The ambient lighting device includes a controller, an ambient lamp, and a camera. The controller includes a central processing unit and a memory, the ambient light includes at least one light strip, the luminous light strip includes a plurality of lamp beads, the plurality of lamp beads are arranged into a display frame, and the camera is used to capture an environmental reference image. The central processing unit is used to call and run a computer program stored in the memory to execute a lighting control method, so as to control the lamp beads in the ambient lamp to emit light according to the environmental reference image. The method includes: starting the ambient lamp and the camera; reading preset frame configuration information, and dividing the display frame into a plurality of unit frames according to the frame configuration information, such that each unit frame correspondingly covers multiple lamp beads in the ambient lamp; reading the environment reference image, and dividing the environment reference image into a plurality of regional images corresponding to the plurality of unit frames according to the frame configuration information; and generating a lighting color value corresponding to each lamp bead in each unit frame, based on a main color tone of the regional image corresponding to the unit frame, and controlling the corresponding lamp beads covered by the unit frame with the lighting color value to emit light. The generating the light color value corresponding to each lamp bead in each unit frame further includes: distinguishing dark-light pixels and non-dark-light pixels in the regional image according to a preset dark-light threshold; determining the lighting color value corresponding to the main color tone of the regional image according to a lighting color value of the non-dark-light pixels of the regional image; and generating the lighting color value corresponding to each lamp bead in the unit frame corresponding to the regional image according to the lighting color value corresponding to the main color tone.

According to another aspect of the present disclosure, a non-transitory computer-readable storage medium is provided for storing a computer program of computer-readable instructions. When the computer program is called and executed by a computer device, a lighting control method for an ambient lighting device is implemented. The method includes: starting an ambient lamp and a camera, wherein the ambient lamp includes at least one lighting strip, the lighting strip includes a plurality of lamp beads, and the plurality of lamp beads are arranged into a display frame; reading preset frame configuration information, and dividing the display frame into a plurality of unit frames according to the frame configuration information, such that each unit frame correspondingly covers multiple lamp beads in the ambient lamp; reading an environment reference image captured by the camera, and dividing the environment reference image into a plurality of regional images corresponding to the plurality of unit frames according to the frame configuration information; and generating a lighting color value corresponding to each lamp bead in each unit frame, based on a main color tone of the regional image corresponding to the unit frame, and controlling the corresponding lamp beads covered by the unit frame with the lighting color value to emit light. The generating the light color value corresponding to each lamp bead in each unit frame further includes: distinguishing dark-light pixels and non-dark-light pixels in the regional image according to a preset dark-light threshold; determining the lighting color value corresponding to the main color tone of the regional image according to a lighting color value of the non-dark-light pixels of the regional image; and generating the lighting color value corresponding to each lamp bead in the unit frame corresponding to the regional image according to the lighting color value corresponding to the main color tone.

Accordingly, compared to the prior art, the present disclosure has various technical advantages, including but not limited to: Firstly, after starting the ambient lamp and the camera, the present disclosure divides the display frame composed of the lamp beads contained in one or more light strips of the ambient lamp into multiple unit frames according to the preset frame configuration information, and divides the environmental reference image collected by the camera into multiple regional images corresponding to these unit frames, and determines the lighting color value of the main color tone corresponding to each unit frame separately according to the corresponding relationship between the regional image and the unit frame, and then generates the lighting color value of each lamp bead in the unit frame according to the lighting color value of the main color tone, so that the lamp beads in each unit frame can emit light of the corresponding color following the main color tone corresponding to the unit frame, thereby simulating the lighting color distribution of the entire environmental reference image on the entire display frame of the ambient lamp, so that the overall lighting effect of the ambient lamp can effectively reproduce the lighting effect of the environmental reference image in a more delicate way, which can enhance the light atmosphere effect of the original image and improve the ability of the ambient lamp to shape the atmosphere.

Secondly, when determining the lighting color value corresponding to each unit frame, the present disclosure first determines the main color tone with the help of the regional image corresponding to each unit frame, and then determines the lighting color value of each lamp bead based on the main color tone, so that each unit frame always has an effective main color tone corresponding to the unit frame, which can avoid the situation where the ambient lamp emission cannot truly reflect the lighting effect due to the complex color distribution of the environmental reference image. At the same time, since the light atmosphere is simulated with a finer granularity of unit frames, even if individual unit frames fail to accurately reflect the actual light atmosphere, the effect of the joint action of multiple unit frames can still ensure that the actual light atmosphere is accurately reflected as a whole, ensuring that the lighting effect shaping effect of the ambient lamp is more stable and balanced.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the technology may derive other drawings from these accompanying drawings without creative efforts.

FIG. 1 shows an ambient light in a form of a frame or border light, and FIG. 2 shows an ambient light in a form of a curtain light;

DETAILED DESCRIPTION

Figure 1:
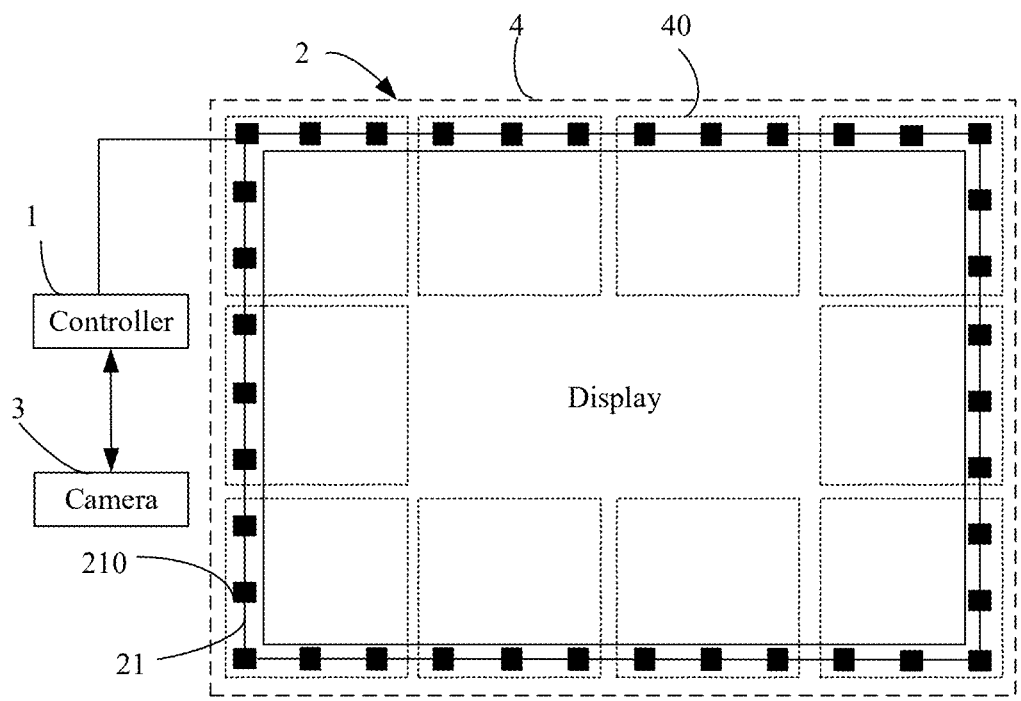
FIGS. 1 and 2 illustrate schematic diagrams of the electrical structure of an ambient lighting device according to an embodiment of the present disclosure.
Figure 2:
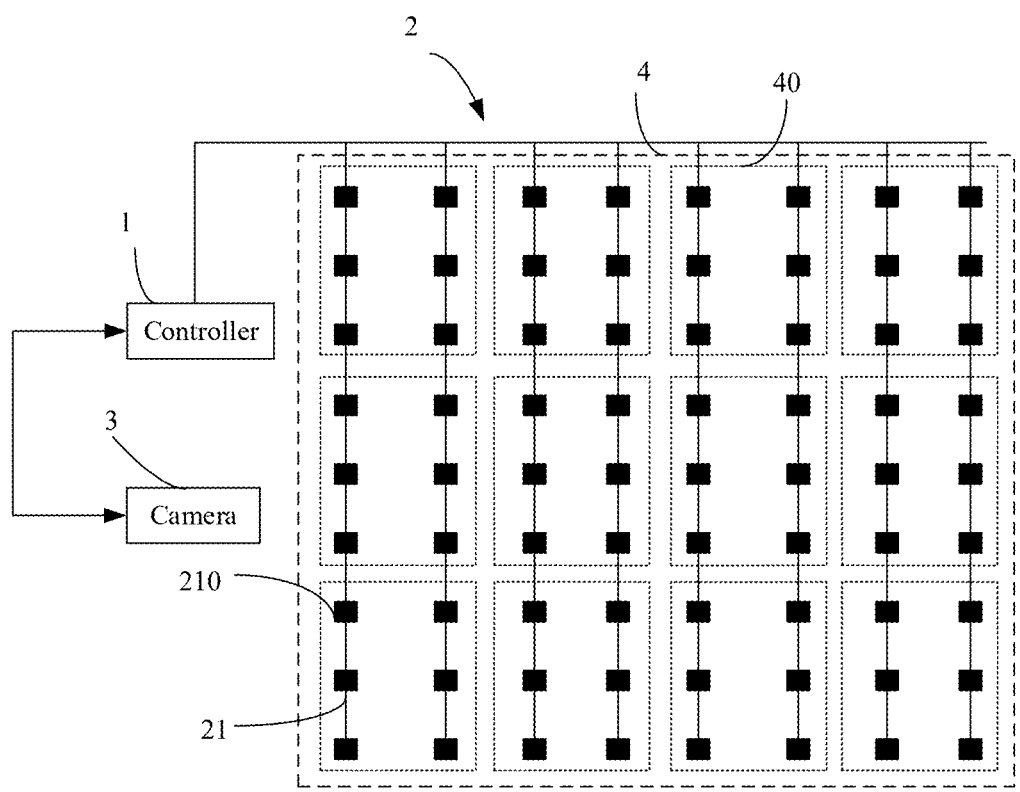

FIGS. 1 and 2 illustrate schematic diagrams of an electrical structure of an ambient lighting device according to an embodiment of the present disclosure. As shown in FIGS. 1 and 2, the ambient lighting device of the present disclosure includes a controller 1, an ambient lamp 2, and a camera 3, etc. The ambient lamp 2 and the camera 3 are electrically connected to the controller 1 so as to accept the control of computer program running in the controller 1 and work together to realize lighting effect playback.

The controller 1 usually includes a control chip, a communication component, and a bus connector. In some embodiments, the controller 1 can also be configured with a power adapter, a control panel, and a display screen, etc., as needed.

The power adapter is mainly used to convert the mains power into direct current to power the entire ambient lighting device. The control chip of the controller 1 can be implemented using various embedded chips, such as Bluetooth SoC (System on Chip), WiFi SoC, MCU (Micro Controller Unit), DSP (Digital Signal Processing) and other types of chips. The control chip usually includes a central processing unit and a memory. The memory and the central processing unit are used to store and execute program instructions respectively to realize corresponding functions.

The communication component can be used to communicate with external devices, for example, to communicate with a personal computer or various intelligent terminal devices, so that after the user issues various configuration instructions through the terminal device, the control chip can receive the configuration instructions through the communication component, and complete the basic configuration of the interface real-time-shot image, so as to control the work of the ambient lamp accordingly. A bus connector is mainly used to connect the power supply to the ambient lamp 2 connected to the bus and to provide lighting effect playback instructions, so the corresponding pins of the power bus and the signal bus are provided. Therefore, when the ambient lamp 2 needs to be connected to the controller 1, it can be connected to the bus connector through the corresponding connector of the ambient lamp. The control panel usually provides one or more buttons for implementing switch control of the controller 1, and selecting various preset lighting effect control modes, etc. The display screen can be used to display various control information, so as to cooperate with the buttons in the control panel to support the realization of human-computer interaction functions. In some embodiments, the control panel and the display screen can be integrated into the same touch display screen.

The ambient lamp 2 shown in FIG. 1 is arranged around the display of the terminal device to become a border or frame lamp. The frame lamp can be surrounded by a single or multiple light strips connected to the bus. The ambient lamp 2 shown in FIG. 2 is arranged in a curtain shape, which becomes the form of a curtain lamp 2, and the curtain lamp usually includes a plurality of light strips 21 connected to a bus. Each light strip 21 of the ambient lamp 2 includes a plurality of lamp beads 210 connected in series, and when a plurality of light strips 21 are used, the number of lamp beads 210 of each light strip 21 is usually the same.

When arranged as a frame lamp, although all the lamp beads are arranged around the four sides of the display, it can be regarded as a display frame 4 formed on the basis of a lamp bead matrix structure. But the central part of the display frame 4 is not provided with lamp beads, and the lamp beads are only arranged on the four sides. When the lighting effect is played, a certain light atmosphere effect can be scattered inside and outside the range of the display frame 4.

When arranged as a curtain lamp, the lamp beads 210 of each light strip 21 are usually arranged at equal intervals. As shown in FIG. 2, each light strip 21 is unfolded according to a layout, so that all the lamp beads in all the light strips 21 are arranged in an array to form a lamp bead matrix structure. Since all the lamp beads can provide a frame effect when they are illuminated in coordination, the surface where the entire lamp bead matrix structure is located constitutes a display frame 4. When the lighting effect is played, a certain pattern effect can be formed within the display frame 4. When a single pattern is statically displayed, it is a static lighting effect, and when the pattern is switched in sequence, a dynamic lighting effect can be formed.

Each light strip 21 is composed of a plurality of lamp beads 210 connected in series. The lamp beads 210 in the same light strip 21 transmit the operation electric current through the same set of cables connected to the bus. The lamp beads 210 in the same light strip 21 can be connected in parallel in terms of electrical connection. In one embodiment, when there are multiple light strips, each light strip 21 in the same lamp bead matrix structure can be arranged at equal intervals along the bus direction, and the lamp beads 210 of each light strip 21 are also arranged correspondingly in quantity and position, so that the entire display frame 4 plays a role similar to a screen when viewing its lighting effect at a distance, and can form a pattern effect in human vision.

The controller 1 of the ambient lighting device is used to realize the operation control of the entire ambient lighting device and is responsible for the communication inside and outside the entire ambient lighting device. The controller 1 is also responsible for driving the camera 3 to operate, collecting environment reference images frame-by-frame through the camera 3, and then generating the lighting effect playback instruction of the corresponding frame according to each frame of the environment reference images, and controlling the ambient lamp to play the lighting effect of the corresponding frame through the lighting effect playback instruction.

When the camera 3 is responsible for collecting environmental reference images, the specific environment of the collected images can be flexibly set by the user. For example, the user can aim the camera 3 at a graphical user interface of a terminal device to capture the real-time-shot images of the interface as the corresponding environmental reference images for playing the lighting effect, so that the ambient lamp 2 can generate the corresponding lighting effect according to the real-time-shot image of the interface. The user can also aim the camera 3 at the physical space environment, such as the outdoor environment, and record the real scene images as the environmental reference images, so that the ambient lamp 2 can play the corresponding lighting effect according to the real scene.

According to the product architecture of the above ambient lighting device, the lighting control method of the ambient lighting device of the present disclosure can be implemented as a computer program product, which is installed and stored in the memory of the control chip in the controller of the ambient lighting device, and is called and run by the central processing unit in the control chip from the memory. During operation, the ambient lamp is controlled to play the corresponding lighting effect according to the environmental reference images collected by the camera.

Figure 3:
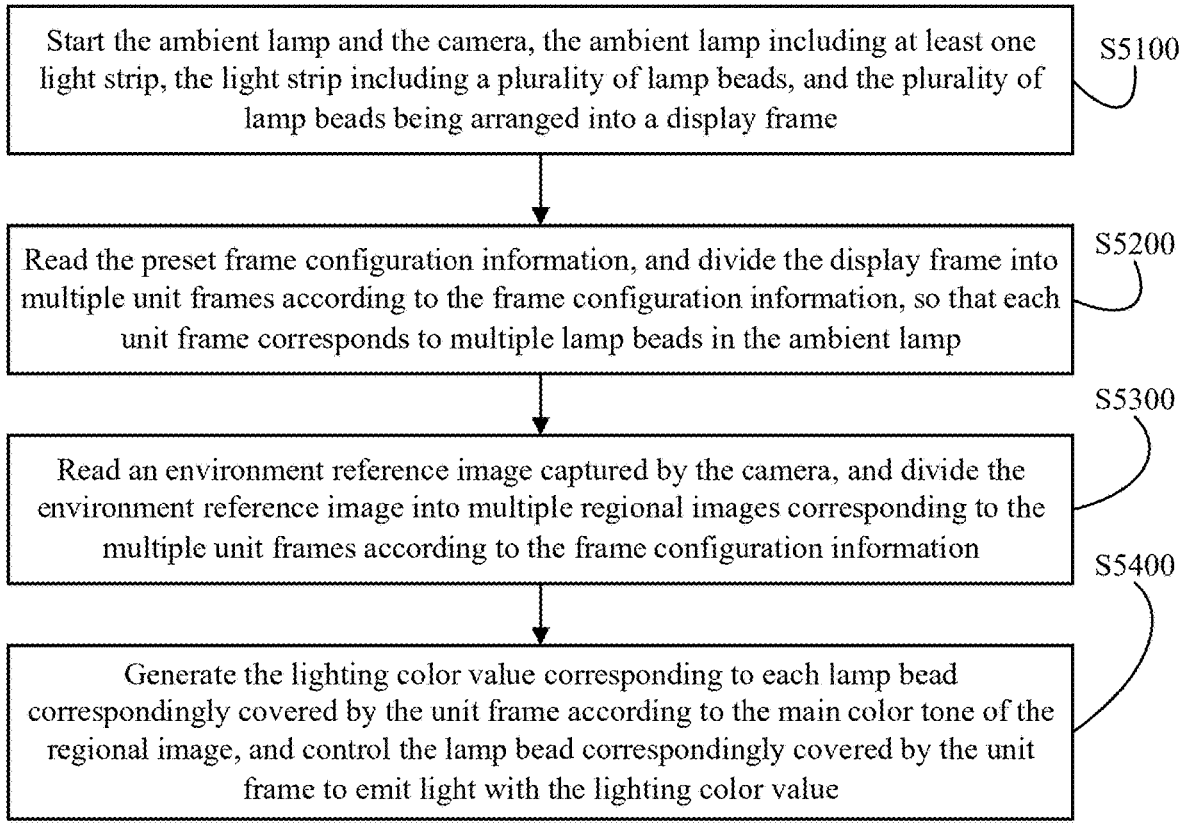
FIG. 3 illustrates a flow chart of a lighting control method of the ambient lighting device according to an embodiment of the present disclosure.

Referring to FIG. 3, in one embodiment, the lighting control method of the ambient lighting device of the present disclosure includes the followings.

Step S5100, start the ambient lamp and the camera, the ambient lamp includes at least one light strip, the light strip includes a plurality of lamp beads, and the plurality of lamp beads are arranged into a display frame.

As mentioned above, the ambient lighting device of the present disclosure includes an ambient lamp and a camera. When the ambient lighting device is powered on, the controller can call and execute a computer program from the memory, and through the default initialization process of the computer program, the ambient lamp and the camera are powered on and initialized, and the driving configuration of the ambient lamp and the camera is completed, so that the ambient lamp and the camera are in the operational state.

In one embodiment, when the controller starts the ambient lamp, it can send a self-test instruction to the ambient lamp, driving each lamp bead in each light strip of the ambient lamp to return its position information in the light strip. Each lamp bead is provided with a corresponding control chip for data communication with the control chip in the controller, so that its own characteristic information can be serially connected with the characteristic information of other lamp beads in accordance with a serial communication protocol to realize the representation of its own position information. The serial communication protocol executed between the controller and the lamp beads can be any one of IIC (Inter-Integrated Circuit), SPI (Serial Peripheral Interface), and UART (Universal Asynchronous Receiver-Transmitter). After the controller obtains the result data returned by the self-test of each lamp bead from the bus, it parses the result data and determines the position of each lamp bead in the display frame 4 presented by the entire ambient lamp according to the order of the characteristic information of each lamp bead in the result data. Thus, each lamp bead can be understood as a basic pixel. When constructing the lighting effect playback instruction, the controller can set the corresponding lighting color value for each basic pixel according to the position information of each lamp bead and the actual needs.

In one embodiment, after the ambient lighting device is powered on, the camera driver code is loaded according to the default business logic by executing the computer program in the memory, so that the camera is in the operational state, continuously collecting the real scene of the physical space within the lens alignment range, obtaining corresponding image data, and generating corresponding preview image frames in the texture space, so that multiple image frames generated in time sequence are formed in the image space corresponding to the camera.

Step S5200, read the preset frame configuration information, divide the display frame into multiple unit frames according to the frame configuration information, so that each unit frame corresponds to multiple lamp beads in the ambient lamp.

The ambient lighting device can pre-set the frame configuration information corresponding to the ambient lamp, in which the granularity of the plane subdivision of the entire display frame 4 is specified, so that the entire display frame 4 can be divided into multiple unit frames 40 according to the constraints of the frame configuration information. Usually, as shown in the frame lamp of FIG. 1, after division, each unit frame 40 can cover multiple adjacent lamp beads; or as shown in the curtain lamp of FIG. 2, after division, each unit frame 40 can cover multiple adjacent light strips, and each light strip can also cover multiple lamp beads. The setting of the granularity of dividing the display frame 4 in the frame configuration information can be implemented flexibly. For example, the frame configuration information can specify that the unit frame 40 is divided according to a nine-square grid, sixteen-square grid, etc., and correspondingly, it can be expressed as the total number of unit frames, such as 9, 16, etc. Thus, the entire display frame 4 can be divided into unit frames 40 according to the set values. The frame configuration information can also specify the number of light strips (number of columns) and the number of lamp beads (number of rows) spanned by each unit frame, and then determine the corresponding lamp beads 210 covered by the unit frame 40 according to the corresponding number of rows and columns. The frame configuration information can also only set the total number of unit frames 40 to be generated.

Since the state of the ambient lamp is set according to the number and layout of the assembled light strips, although FIGS. 1 and 2 show that the unit frames of the curtain lamp and frame lamp in different forms can be set in the same division way, considering that the frame lamp can be viewed linearly based on a single light strip, the division of the unit frames can also be handled in a simpler way. For example, when the controller has the total number of lamp beads and the frame configuration information, it can simply divide the total number of lamp beads into equal parts to quickly determine the unit frames in the vertical and horizontal directions. For example, a simple implementation method is to divide the entire display frame into four unit frames: upper left, upper right, lower left, and lower right. Correspondingly, the environmental reference image can be set as four regional images later, which may be fast and efficient.

The frame configuration information can be set through the human-computer interaction function implemented on the controller, or it can be set and transmitted to the controller through a terminal device that establishes a data communication connection with the controller, and the controller stores the frame configuration information in the memory of its control chip and reads the information when needed.

In the case where the ambient lamp is a curtain lamp, considering that the light strips of the curtain lamp can be flexibly configured to increase or decrease as needed, in one embodiment, the controller can first detect the number of light strips, more specifically, detect the total number of lamp beads of the entire curtain lamp. By detecting the total number of lamp beads, the basic total number of pixels of the entire display frame is determined and, then, according to the value set in the frame configuration information, such as the value 16, it is understood that the entire display frame of the curtain lamp is divided into a matrix of 4*4 unit frames. Then, the number of columns is calculated according to the number of light strips, and the number of rows is calculated according to the number of lamp beads in each light strip. Further, the number of rows and columns occupied by each unit frame is determined, and the mapping relationship data is established between each unit frame and the light strips corresponding to its number of rows and columns and the lamp beads in the light strips, so as to realize the division of the entire unit frame and obtain the relevant data of each unit frame. By dividing the display frame in this way, it is possible to adapt to the changes in the number of light strips and lamp beads, flexibly adjust the pixel density of each unit frame, and enable the controller to adaptively set the pixel density of the unit frame for the increase or decrease of the light strips in the curtain lamp, keep the lighting effect playback logic unchanged, and ensure that the lighting effect of the curtain lamp can still be played normally even after the increase or decrease of the light strips.

Also considering that the light strips of the curtain lamp can be flexibly configured to increase or decrease as needed, in another embodiment, the number of light strips and lamp beads covered by each unit frame can be specified in the frame configuration information, for example, 4*4 lamp beads constitute a unit frame. When the number of the light strips of the curtain lamp increases or decreases, the next time the unit frame is divided, the entire display frame is still divided into unit frames according to the established specifications. Therefore, the number of light strips and lamp beads corresponding to each unit frame remains unchanged, but the number of the unit frames may increase or decrease with the increase or decrease of the number of the light strips, which is equivalent to increasing or decreasing the density of the unit frame in the entire display frame. For the lighting effect playback of the curtain lamp, it can still be ensured to be normal.

Step S5300, read an environment reference image captured by the camera, and divide the environment reference image into multiple regional images corresponding to the multiple unit frames according to the frame configuration information.

During operation, the controller can continuously read each image frame captured by the camera from the image space corresponding to the camera at a fixed time interval as the environment reference image, which is used to determine the lighting effect to be played by the ambient lamp and generate the corresponding lighting effect playback instruction, and control the ambient lamp to play the corresponding lighting effect. When an image frame is used as the environmental reference image of the current frame and is used to generate and play the corresponding lighting effect, the next image frame can be obtained as the new current frame to generate and play the corresponding lighting effect of the new frame. As a result, the lighting effect process played by the entire ambient lamp is basically synchronized with the image change process presented by the object facing the camera, which plays the role of extending the target ambient light atmosphere captured by the camera to the ambient lamp.

In the present disclosure, each unit frame in the entire display frame of the ambient lamp is used as a unit to establish a corresponding relationship with each regional image in the environmental reference image, so as to use the regional image corresponding to the unit frame to set the lighting color value for each lamp bead in the unit frame, and realize the mapping of the hue or color tone of the regional image to the lighting color of the lamp bead in the corresponding unit frame.

Accordingly, the frame configuration information pre-set in the controller can be obtained in the same way as previously explained to partition the display frame, and the environmental reference image is divided according to the frame configuration information, and the environmental reference image is divided into regional images corresponding to each unit frame in the display frame.

For example, in one embodiment, the number of unit frames is specified in the frame configuration information, and the number is generally a square number such as 9, 16, 25, etc. In this case, a corresponding number of regions can be divided in the environment reference image according to the resolution dimensions in the vertical and horizontal directions of the environment reference image, and these regions are correspondingly divided into corresponding regional images. Each regional image corresponds one-to-one to a unit frame. For ease of processing, mapping relationship data between each unit frame and its corresponding regional image can be established for late retrieval.

In another embodiment, the frame configuration information specifies the number of rows and columns of lamp beads covered by each unit frame. In this case, the number of unit frames determined in the previous step can be used to partition the environmental reference image. Specifically, after the division in the previous step, the number of unit frames in the row and column directions of the entire display frame is determined. Therefore, according to the number of rows and the number of columns of the unit frames, the resolution size of the environmental reference image in both the vertical direction and the horizontal direction can be evenly divided in the row and column directions, thereby determining each corresponding areas, and the corresponding regional image can be partitioned out from each area, and each regional image corresponds to a unit frame. Similarly, the mapping relationship data between each unit frame and its corresponding regional image can be established for late retrieval.

It should be noted that, in the case where the ambient light is a frame lamp, since there is no lamp bead in the central part of the display frame, it is not necessary to consider the correspondence between each unit frame and the regional image in the central part, or the regional images in the central part are merged into the regional images close to the side of the entire environmental reference image, and together with the regional images of the side, a mapping relationship is established with the unit frames corresponding to the regional image of the side.

Accordingly, it can be known that, under the constraint of the frame configuration information, the controller can establish a display frame divided into multiple unit frames, and can also divide the environmental reference image into multiple regional images, so that each regional image corresponds to a unit frame, so as to determine the lighting color of the lamp beads covered by the unit frame.

Step S5400, generate the lighting color value corresponding to each lamp bead covered by the corresponding unit frame according to the main color tone of the regional image, and control the lamp bead correspondingly covered by the unit frame to emit light with the lighting color value.

When determining the lighting color value for the lamp beads in each unit frame, the present disclosure generates the lighting color value with reference to the main color tone of the regional image mapped to the corresponding unit frame, so that each unit frame can roughly reflect the main color tone formed by its corresponding regional image, thereby realizing the projection of the full-frame light atmosphere of the entire environmental reference image on the display frame of the entire ambient lamp, so that the light effects played by the ambient lamp plays the role of effectively expanding the light atmosphere of the environmental reference image.

When determining the main color tone of the regional image, the significant color constituting the regional image can be determined as the main color tone of the regional image. In one embodiment, the regional image can be first analyzed for color tone, multiple color tone intervals can be determined, the total number of pixels in each color tone interval can be identified, and the pixels corresponding to the color tone interval with the largest total number of pixels can be determined as the main pixels reflecting the main color tone, and the main color tone can be determined according to the color values of these main pixels. In another embodiment, since the highlights and dark parts in the image are usually not regarded as the color tones expressed by the image, the pixels corresponding to the dark parts and/or highlights in the regional image can be filtered out in advance, and then the main color tone is determined according to the color values of the remaining pixels, and the main color tone is the main color tone of the regional image. The main color tone determined by these methods can determine the significant color in the complex hue distribution. The determined main hue or color tone can better reflect the main color to be expressed by the corresponding regional image, and thus can more accurately reflect the lighting effect of the regional image. The main color tone can be determined by taking the average of the color values of all relevant target pixels, or by first removing the extreme values of the preset range of the color values of all target pixels and then taking the average to determine the main color tone. The specifics can be set flexibly, and the final average number can be used as the lighting color value of the regional image.

After the lighting color value of the main color tone of a regional image is determined, it can be further used to determine the lighting color value of each lamp bead covered by the unit frame corresponding to the regional image. As long as the lighting color value of each lamp bead in the unit frame is always associated with the lighting color value setting of the main color tone, and ensure that this setting is maintained within a reasonable range of variation relative to the lighting color value of the main color tone, the projection of the main color tone of the regional image by the lighting effect of the lamp bead can be achieved, thereby achieving the atmosphere expansion effect.

After determining the corresponding lighting color values of the lamp beads in each unit frame in the entire display frame of the ambient lamp in the above manner, the lighting effect playback instruction corresponding to the current frame's ambient reference image can be generated according to the default business logic and the corresponding lighting color values and position information of each lamp bead. The lighting effect playback instruction is transmitted to each light strip of the ambient lamp. The control chip of each lamp bead in each light strip extracts the corresponding lighting color value according to a serial communication protocol, controls the corresponding lighting unit to emit light of the corresponding color, and realizes the coordinated playback of the lighting effect of the current frame.

According to the above embodiments, compared to the prior art, the present disclosure has various technical advantages, including but not limited to: Firstly, after starting the ambient lamp and the camera, the present disclosure divides the display frame composed of the lamp beads contained in one or more light strips of the ambient lamp into multiple unit frames according to the preset frame configuration information, and divides the environmental reference image collected by the camera into multiple regional images corresponding to these unit frames, and determines the lighting color value of the main color tone corresponding to each unit frame separately according to the corresponding relationship between the regional image and the unit frame, and then generates the lighting color value of each lamp bead in the unit frame according to the lighting color value of the main color tone, so that the lamp beads in each unit frame can emit light of the corresponding color following the main color tone corresponding to the unit frame, thereby simulating the lighting color distribution of the entire environmental reference image on the entire display frame of the ambient lamp, so that the overall lighting effect of the ambient lamp can effectively reproduce the lighting effect of the environmental reference image in a more delicate way, which can enhance the light atmosphere effect of the original image and improve the ability of the ambient lamp to shape the atmosphere.

Secondly, when determining the lighting color value corresponding to each unit frame, the present disclosure first determines the main color tone with the help of the regional image corresponding to each unit frame, and then determines the lighting color value of each lamp bead based on the main color tone, so that each unit frame always has an effective main color tone corresponding to the unit frame, which can avoid the situation where the ambient lamp emission cannot truly reflect the lighting effect due to the complex color distribution of the environmental reference image. At the same time, since the light atmosphere is simulated with a finer granularity of unit frames, even if individual unit frames fail to accurately reflect the actual light atmosphere, the effect of the joint action of multiple unit frames can still ensure that the actual light atmosphere is accurately reflected as a whole, ensuring that the lighting effect shaping effect of the ambient lamp is more stable and balanced.

Figure 4:
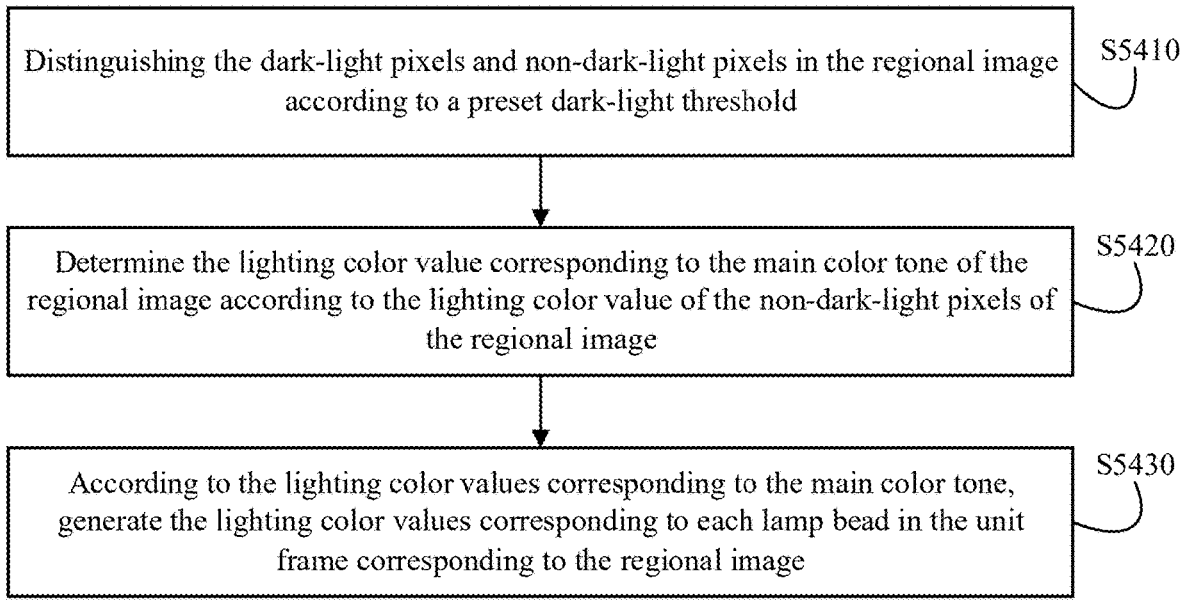
FIG. 4 illustrates a flow chart of generating the lighting color value of lamp beads based on the main color tone of the regional image according to an embodiment of the present disclosure.

Based on above embodiments of the present disclosure, referring to FIG. 4, the process of generating the lighting color value corresponding to each lamp bead covered by the corresponding unit frame according to the main color tone of the regional image may include the following.

Step S5410, distinguishing the dark-light pixels and non-dark-light pixels in the regional image according to a preset dark-light threshold.

The controller can read a preset dark-light threshold to distinguish the dark-light pixels and non-dark-light pixels in each regional image. For example, in a scene where the pixel color value is usually represented by RGB, the value of a pure black pixel can be represented as RGB (0,0,0), and the dark-light threshold can be set to an adjacent value close to the value of the pure black pixel, such as RGB (10,10,10). Accordingly, the pixels in the regional image that are lower than or equal to the dark-light threshold are dark-light pixels, and the pixels that are higher than the dark-light threshold are non-dark-light pixels, thereby achieving the distinguishing.

In one embodiment, the process of distinguishing each pixel in the regional image can be implemented according to the following process.

Step S5411, traverse the lighting color values of each pixel of the regional image, and mark the corresponding proportion of pixels whose lighting color values are lower than the preset dark-light threshold as dark-light pixels according to a preset ratio threshold.

The regional image is bitmap data, so it can be traversed row by row and column by column according to its resolution size, and the lighting color value of each traversed pixel is compared with the dark-light threshold to determine whether each pixel is a dark-light pixel.

In order to avoid misjudging some pixels with dark tones as dark-light pixels, resulting in very few non-dark-light pixels when the regional image has a large range of dark-prone colors, which is not conducive to accurately calibrating the main color tone. In this case, a preset ratio threshold is used to control the total amount of dark-light pixels, thereby ensuring that the total amount of non-dark-light pixels is not less than a certain range.

For example, it can be set that the total amount of dark-light pixels in all pixels in the regional image is not higher than the ratio threshold, such as 90%. In this case, pixels with lower pixel color values are preferentially marked as dark-light pixels. When the total amount of dark-light pixels is maintained at no more than 90%, even if the color value of an individual pixel is lower than the dark-light threshold, it is higher than the color value of other dark-light pixels, so the pixel can still be identified as a non-dark-light pixel. After determining that a pixel belongs to a dark-light pixel, it is marked accordingly, thereby filtering the dark-light pixels for the regional image.

Step S5412, mark the pixels other than the dark-light pixels in the regional image as non-dark-light pixels.

Similarly, for other pixels in the regional image that are not dark-light pixels, those pixels can be directly marked as non-dark-light pixels.

In the above embodiments, by setting a ratio threshold to ensure that the ratio of dark-light pixels in the filtered regional image does not exceed the predetermined ratio threshold, it is ensured that there are enough non-dark-light pixels to determine the main color tone of the regional image. For some low-light image areas, their main color tone can still be accurately identified, ensuring that the corresponding unit frame can obtain the lighting color value corresponding to the effective lighting effect.

Step S5420, determine the lighting color value corresponding to the main color tone of the regional image according to the lighting color value of the non-dark-light pixels of the regional image.

The lighting color value of the non-dark-light pixels stored in the regional image can be used as the main basis for determining the main color tone of the regional image, and based on this, multiple implementation methods can be provided.

For example, in one implementation method, the lighting color values of all non-dark-light pixels in the regional image are averaged, and the average is used as the lighting color value corresponding to the main color tone. Thus, the main color tone determined by the corresponding regional image is the basic hue comprehensively presented by the non-dark-light pixels of the regional image.

In another implementation method, the lighting color values of all non-dark-light pixels and the lighting colors of all dark-light pixels in the regional image are averaged respectively, and the two averages are weighted according to the preset weights to obtain the average as the lighting color value corresponding to the main color tone. This method can avoid the influence of over-filtering the dark-light area on the main color tone of the regional image. Of course, when setting the weights of the two averages, the weight corresponding to the non-dark-light pixels can be enlarged and the weight of the dark-light pixels can be reduced. For example, the weight of the average of the lighting color values of the non-dark-light pixels and the weight of the average of the lighting color values of the dark-light pixels are set to 0.9:0.1. Thus, the main color tone of the regional image is still determined significantly based on the lighting color values of the non-dark-light pixels, but the role of the dark-light pixels is also considered, so that the lighting color values of the main color tone finally determined are more balanced.

Step S5430, according to the lighting color values corresponding to the main color tone, generate the lighting color values corresponding to each lamp bead in the unit frame corresponding to the regional image.

When a regional image determines the lighting color value corresponding to its main color tone, the lighting color values of each lamp bead covered by the unit frame corresponding to the regional image can be generated accordingly. The specific implementation method can be flexibly set.

For example, in one embodiment, the lighting color value corresponding to the main color tone is set as the lighting color value of each lamp bead covered by the unit frame corresponding to the regional image. That is to say, the lighting color values of each lamp bead covered by the unit frame corresponding to the regional image are set to be consistent with the lighting color value of the main color tone of the regional image, and each lamp bead emits light according to the same lighting color value. When the corresponding lighting effect is played in this way, the lighting effect presented by the entire display frame of the ambient lamp corresponds to the distinct colors of each regional image.

In another embodiment, according to the lighting color value of the main color tone adopted by another unit frame adjacent to the current unit frame corresponding to the regional image, the lighting color value of each lamp bead covered by the current unit frame is gradually adjusted, so that the lighting color value gradient-change relationship is formed between each lamp bead in the current unit frame along the direction toward the other unit frame. That is to say, the lighting color value of the lamp beads of a unit frame maintains the lighting color value corresponding to the main color tone from the center position of the unit frame, and then along the way toward the other adjacent unit frame, refer to the color value of the other unit frame. Based on the lighting color value corresponding to the main color tone, according to a certain gradient, gradually change the lighting color value of each lamp bead in this direction to adjust the certain gradient value. When the corresponding lighting effect is played, a lighting effect of color transition is formed from a main color tone of a unit frame to another main color tone corresponding to another adjacent unit frame. By setting the lighting color value of each lamp bead corresponding to each unit frame in this way, the lighting effect of the lamp bead of each unit frame can present a relatively soft transition gradient effect, and the lighting effect presented by the entire display frame of the ambient lamp is generally softer and more delicate.

According to the above embodiments, by distinguishing between dark-light pixels and non-dark-light pixels in the regional image, the lighting color value of the main color tone of the regional image is determined based on the lighting color value of the non-dark-light pixels. On this basis, the lighting color value of each lamp bead in the unit frame corresponding to the regional image is determined, so that the lighting color value of each lamp bead reflects the main color tone of the regional image, thereby achieving effective projection of the main color tone of the corresponding regional image, and ensuring that the lighting effect played by the ambient lamp can effectively reproduce and expand the atmosphere effect of the environment captured by the camera.

Figure 5:
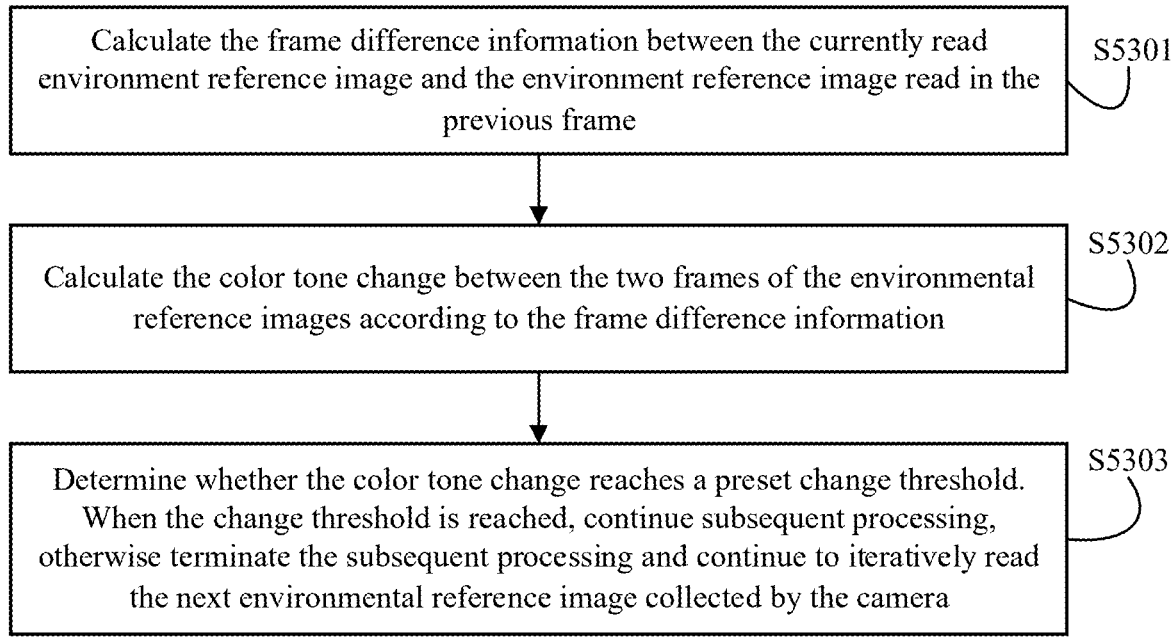
FIG. 5 illustrates a flow chart of determining whether to update the lighting effect of a curtain light based on the frame difference information according to an embodiment of the present disclosure.

Based on above embodiments of the present disclosure, referring to FIG. 5, after reading the environment reference image captured by the camera, the process may also include the followings.

Step S5301, calculate the frame difference information between the currently read environment reference image and the environment reference image read in the previous frame.

The camera may continuously capture multiple image frames as environment reference images. The controller can theoretically continuously process each frame of environment reference image and generate corresponding lighting effects for playback. However, sometimes the image content of the two or more before-and-after image frames changes little, resulting in a small change in the hue between them. There is no need to frequently switch the lighting effect of the ambient lamp, which can also make the ambient lamp produce a certain stability during the lighting effect playback process, and will not cause frequent switching of lighting effects due to slight changes in light.

To this end, the controller can use the currently processed environment reference image as the current frame and calculate the frame difference information with the environment reference image of the previous frame, so as to determine the difference in color values between each pixel point to form the frame difference information. When calculating the difference between pixels at the same position, the color values of multiple color channels of each pixel can be fitted to the same color value in an average manner and then the difference can be calculated. For example, the pixel color value of the previous frame is RGB (100, 100, 100), and the corresponding pixel color value of the current frame is RGB (100, 40, 40), then the difference between the two is (100−100+100−40+100−40)/3=40.

Step S5302, calculate the color tone change between the two frames of the environmental reference images according to the frame difference information.

On the basis that the two before-and-after frames of environmental reference images both have difference of the lighting color values of the corresponding pixels indicated in the frame difference information, it can first calculate the average value of the difference of all pixels, and then divide the difference by the range of the color value, such as 255, to obtain a proportional or normalized result, which can be used to directly represent the color tone change. For the convenience of calculation, it can be expressed as a decimal form. For example, 40/255=0.1569, it can be seen that the color tone change has been normalized to the numerical interval of [0, 1], which has the function of measuring the change.

Step S5303, determine whether the color tone change reaches a preset change threshold. When the change threshold is reached, continue subsequent processing, otherwise terminate the subsequent processing and continue to iteratively read the next environmental reference image collected by the camera.

Corresponding to the color tone change, a change threshold can be preset to measure whether it is necessary to refresh the lighting effect of the ambient lamp, that is, whether it is necessary to generate a new lighting effect playback instruction for the ambient lamp in the current frame corresponding to the environmental reference image of the current frame. The change threshold can be an empirical value set on demand. It is determined whether the color tone change reaches this change threshold. When it is reached, it means that the color tone change has reached a certain degree, i.e., the difference is substantial, and it is necessary to generate the corresponding lighting effect playback instruction corresponding to the environmental reference image of the current frame. Therefore, the subsequent processing of the present disclosure can be continued, for example, it can be continued from step S5400, or from step S5354 in the embodiments of the present disclosure. Otherwise, the color tone change does not reach the change threshold, which means that the image content, especially the light change degree of the current frame environment reference image is relatively small, with respect to the previous frame environment reference image. In this case, it is not necessary to continue to execute step S5400 or step S5354, but continue to iterate in the current processing step, i.e., continuing to read the next frame environment reference image for same processing, and so on, so as to continue to process each frame environment reference image collected by the camera.

According to the above embodiments, it is not difficult to understand that the color tone change reflected by the frame difference information between the two before-and-after frames of environmental reference images can measured by means of a change threshold. Based on whether the color tone change reaches the change threshold, it is determined whether the environmental reference image of the current frame continues to be processed to determine the lighting color value of each lamp bead of the ambient lamp, so as to determine whether to send the lighting effect playback instruction corresponding to the environmental reference image of the current frame to the ambient lamp. This can adapt to the situation where the light atmosphere in the two before-and-after frames of environmental reference images does not change much, avoiding frequent refreshing of the lighting effect of the ambient lamp, effectively reducing the computing load of the controller, and ensuring the processing ability of the control chip of the controller to respond to other tasks, so as to avoid lighting-effect disorder and destroying the lighting atmosphere due to frequent refreshing of the lighting effect. Thus, it makes the lighting effect of the ambient lamp more stable and balanced.

Based on the above embodiments of the present disclosure, before generating the lighting color value corresponding to each lamp bead in the unit frame corresponding to the regional image according to the lighting color value corresponding to the main color tone, the method may also include the followings.

Step S5354, determine whether the lighting color value corresponding to the main color tone of the regional image belongs to the first color value range corresponding to a preset blind-spot color. When it is determined that the main color tone belongs to the first color value range, the lighting color value of the main color tone is converted to a second color value range corresponding to another color.

In practice, there is a group of people who have special needs for lighting effect, and such needs are often ignored. Specifically, color-blind people might not perceive certain colors, but the current ambient lamps do not consider such needs when playing lighting effects. If the lighting effects played by the ambient lamps cannot be effectively perceived by such people, the effect of the lighting effects created by the ambient lamp will be greatly reduced. Thus, in the present disclosure, in order to further adapt to this demand, users can set blind spot colors to indicate colors that users do not want to see, so as to instruct the controller to avoid the corresponding colors when determining the color values of each lamp bead of the ambient lamp. Blind spot colors can usually be expressed as color value ranges, which are called first color value ranges for distinction.

On the basis of determining the blind spot color, when determining the lighting color value of the main color tone corresponding to each regional image, it can be first determined whether the lighting color value belongs to the first color value range corresponding to the blind spot color. When it belongs to the first color value range, it means that the corresponding color-blind user cannot accurately recognize the color corresponding to the lighting color value. In this case, the lighting color value of the main color tone can be migrated and transformed to the second color value range corresponding to another color according to the preset rules. For example, the value range corresponding to red is transformed to the value range corresponding to blue. Thus, the performance on the blind-spot color is migrated to another color system, making it easier for users to perceive the corresponding lighting effect.

According to the above embodiments, it is determined whether the lighting color value of the main color tone belongs to the blind spot color, when it belongs to the blind spot color, the lighting color value is migrated to the color system, so that each lamp bead can determine the lighting color value of the lamp bead according to the main color tone for application, avoiding the emission of light that the color-blind user cannot accurately recognize, so that such special users can grasp the lighting atmosphere changes of the scene aimed at by the camera through the lighting effect of the ambient lamp, further reflecting the humanistic care of the ambient lamp product, and promoting the popularization of the ambient lamp product.

Figure 6:
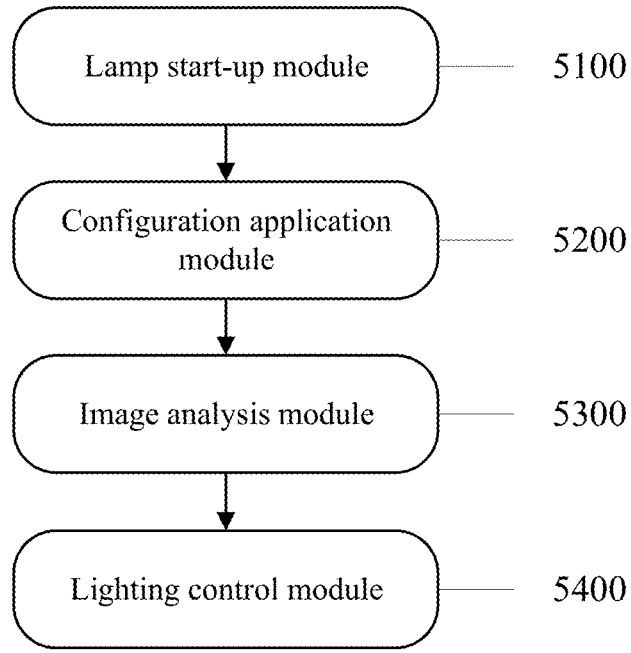
FIG. 6 illustrates a structural diagram of a lighting control device of the ambient lighting device according to an embodiment of the present disclosure.

Referring to FIG. 6, in another embodiment of the present disclosure, a lighting control device is provided for an ambient lighting device. The lighting control device may include a lamp start-up module 5100, a configuration application module 5200, an image analysis module 5300, and a lighting control module 5400, etc.

The lamp start-up module 5100 is configured to start the ambient lamp and the camera. The ambient lamp includes at least one light strip. The light strip includes a plurality of lamp beads. The plurality of lamp beads are arranged to form a display frame. The configuration application module 5200 is configured to read preset frame configuration information and display the frame configuration information according to the frame configuration information. The display frame is divided into a plurality of unit frames, so that each unit frame corresponds to a plurality of lamp beads in the ambient lamp. The image analysis module 5300 is configured to read the environment reference image collected by the camera, and divide the environment reference image into a plurality of regional images corresponding to the plurality of unit frames according to the frame configuration information; the lighting control module 5400 is configured to generate the lighting color values corresponding to the lamp beads covered by the corresponding unit frame according to the main color tone of the regional image, and control the lamp beads correspondingly covered by the unit frame to emit light with the lighting color value.

Based on the above embodiments of the present disclosure, the lighting color values corresponding to the lamp beads covered by the corresponding unit frame are generated according to the main color tone of the regional image, and the lighting control module 5400 may include: a brightness distinguishing unit, configured to distinguish the dark-light pixels and non-dark-light pixels in the regional image according to a preset dark-light threshold; a hue determining unit, configured to determine the lighting color value corresponding to the main color tone of the regional image according to the lighting color value of the non-dark-light pixel of the regional image; and a lighting color setting unit, configured to generate the lighting color value corresponding to the lamp beads in the unit frame corresponding to the regional image according to the lighting color value corresponding to the main color tone.

Based on the above embodiments of the present disclosure, the brightness distinction unit may include: a dark-light marking subunit, configured to traverse the lighting color value of each pixel of the regional image, and mark the corresponding proportional pixels whose lighting color values are lower than the preset dark-light threshold as dark-light pixels according to the preset ratio threshold; and a non-dark-light marking subunit, configured to mark pixels other than the dark-light pixels in the regional image as non-dark-light pixels.

On the basis of the above embodiments of the present disclosure, the brightness distinction unit may also include: a first brightness distinction unit, configured to average the lighting color values of all non-dark-light pixels in the regional image, and use the average as the lighting color value corresponding to the main color tone; or a second brightness distinction unit, configured to average the lighting color values of all non-dark-light pixels and the lighting colors of all dark-light pixels in the regional image, and weight the two averages according to the preset weights to obtain the lighting color value corresponding to the main color tone.

Based on the above embodiments of the present disclosure, the lighting color setting unit may include: a first lighting color setting unit, configured to set the lighting color value corresponding to the main color tone as the lighting color value of each lamp bead covered by the unit frame corresponding to the regional image; or a second lighting color setting unit, configured to gradually adjust the lighting color value of each lamp bead covered by the current unit frame according to the lighting color value of the main color tone adopted by another unit frame adjacent to the current unit frame corresponding to the regional image, so that the lighting color value gradient change relationship is formed between each lamp bead in the current unit frame along the direction toward the other unit frame.

Based on the above embodiments of the present disclosure, the lighting control device of the ambient lighting device of the present disclosure includes the following units that run after the image analysis module 5300 reads the environmental reference image: a frame difference calculation unit, which is configured to calculate the frame difference information between the currently read environmental reference image and the environmental reference image read in the previous frame; an amplitude determination unit, which is configured to calculate the color tone change between the two before-and-after frames of the environmental reference image according to the frame difference information; an iterative decision unit, which is configured to determine whether the color tone change reaches a preset change threshold, and when the change threshold is reached, continue the subsequent processing, otherwise, terminate the subsequent processing, and continue to iteratively read the environmental reference image collected by the camera.

Based on the above embodiments of the present disclosure, the lighting control device of the ambient lighting device of the present disclosure includes the following modules that may run before the lighting control module 5400: a blind color adaptation module, which is configured to determine whether the lighting color value corresponding to the main color tone of the regional image belongs to the first color value range corresponding to the preset blind spot color, and when it belongs to the first color value range, the lighting color value of the main color tone is converted to the second color value range corresponding to another color.

Figure 7:
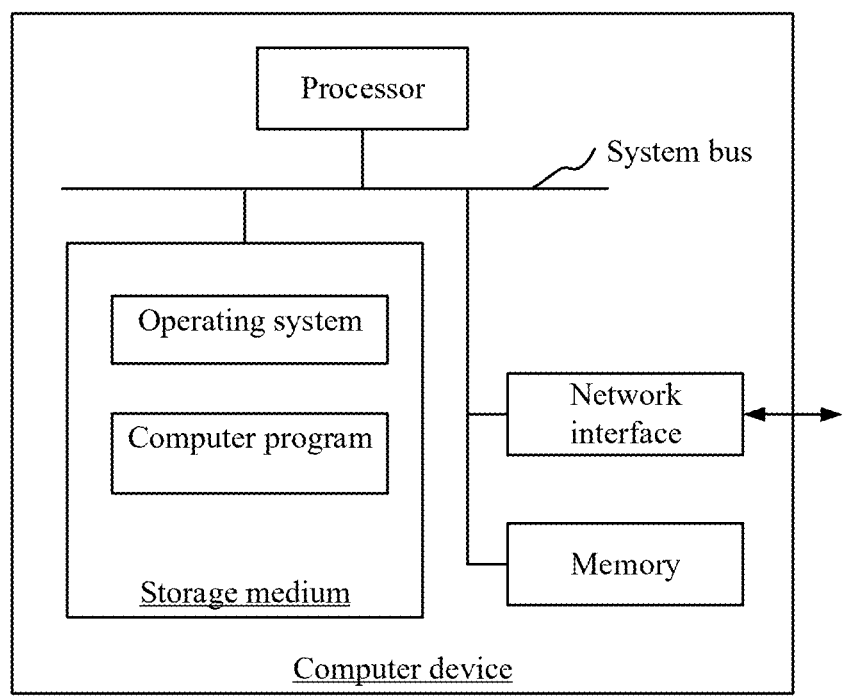
FIG. 7 illustrates a structural diagram of the computer device according to an embodiment of the present disclosure.

Based on the above embodiments of the present disclosure, referring to FIG. 7, in another embodiment of the present disclosure, a computer device is provided to implement the above mentioned functions and systems. For example, the computer device can be used as a controller of an ambient lighting device. As shown in FIG. 7, the computer device may include includes a processor, a computer-readable storage medium, a memory, and a network interface, etc., all connected through a system bus. Among them, the computer-readable storage medium of the computer device may store an operating system, a database and computer-readable instructions, and the database may store a control information sequence. When the computer-readable instructions are executed by the processor, the processor can implement a lighting control method for an ambient lamp system. The processor of the computer device is used to provide computing and control capabilities to support the operation of the entire computer device. The memory of the computer device may store computer-readable instructions, and when the computer-readable instructions are executed by the processor, the processor can execute the lighting control method of the present disclosure. The network interface of the computer device is used to connect and communicate with other devices. It can be understood by those skilled in the art that the structure shown in FIG. 7 is only a block diagram of a partial structure related to the present disclosure, and does not constitute limitation on the computer device to which embodiments of the present disclosure can be applied. The specific computer device may include more or fewer components than shown, or may combine certain components, or may have different component arrangements.

In one embodiment, the processor is used to execute the specific functions of each module and its submodules or units shown in FIG. 6, and the memory stores the program code and various types of data required to execute the above modules or submodules. The network interface is used to transmit data between the terminal device and the server. The memory in one embodiment stores the program code and data required to execute all modules/submodules in the ambient lighting device of the present disclosure, and the server can call the program code and data of the server to execute the functions of all submodules.

The present disclosure also provides a storage medium storing computer-readable instructions. The computer-readable instructions can be executed by one or more processors, so as to implement the steps of the lighting control method of the ambient lighting device described in any embodiment of the present disclosure.

The present disclosure also provides a computer program product, including a computer program/instructions. When the computer program/instructions are executed by one or more processors, the steps of the lighting control method of the ambient lighting device described in any embodiment of the present disclosure are implemented.

A person skilled in the art can understand that the implementation of all or part of the processes in the above-mentioned embodiments of the present disclosure can be completed by instructing the relevant hardware through a computer program. The computer program can be stored in a computer-readable storage medium. When the program is executed, it can include the processes of above embodiments of the present disclosure. Among them, the aforementioned storage medium may be a non-transitory computer-readable storage medium such as a magnetic disk, an optical disk, a read-only memory (ROM), or a random access memory (RAM).

The above is only partial embodiments of the present disclosure. It should be pointed out that for those of ordinary skill in the art, several improvements and modifications can be made without departing from the principle of the present disclosure, and the improvements and modifications should also be regarded within the scope of the present disclosure.

Accordingly, the present disclosure can determine the main color tone for the ambient lamp partitions, so as to avoid the ambient lamp emitting monotonous light, too ensure that the lighting effect of the ambient lamp is more stable, balanced and delicate, and to contribute to the industrial promotion of the ambient lamp equipment.

What is claimed is:

1. A lighting control method for an ambient lighting device, comprising:
    starting an ambient lamp and a camera, wherein the ambient lamp includes at least one lighting strip, the lighting strip includes a plurality of lamp beads, and the plurality of lamp beads are arranged into a display frame;
    reading preset frame configuration information, and dividing the display frame into a plurality of unit frames according to the frame configuration information, such that each unit frame correspondingly covers multiple lamp beads in the ambient lamp;
    reading an environment reference image captured by the camera, and dividing the environment reference image into a plurality of regional images corresponding to the plurality of unit frames according to the frame configuration information; and
    generating a lighting color value corresponding to each lamp bead in each unit frame, based on a main color tone of the regional image corresponding to the unit frame, and controlling the lamp beads correspondingly covered by the unit frame with the lighting color value to emit light,
    wherein the generating the lighting color value corresponding to each lamp bead in each unit frame further includes:
    distinguishing dark-light pixels and non-dark-light pixels in the regional image according to a preset dark-light threshold;
    determining the lighting color value corresponding to the main color tone of the regional image according to a lighting color value of the non-dark-light pixels of the regional image; and
    generating the lighting color value corresponding to each lamp bead in the unit frame corresponding to the regional image according to the lighting color value corresponding to the main color tone.

2. The lighting control method for an ambient lighting device according to claim 1, wherein the distinguishing dark-light pixels and non-dark-light pixels in the regional image according to a preset dark-light threshold further includes:
    traversing lighting color values of each pixel in the regional image, and marking pixels whose lighting color values of a corresponding proportion are lower than the preset dark-light threshold as the dark-light pixels according to a preset ratio threshold; and
    marking pixels other than the dark-light pixels in the regional image as the non-dark-light pixels.

3. The lighting control method for an ambient lighting device according to claim 1, wherein the determining the lighting color value corresponding to the main color tone of the regional image according to a lighting color value of the non-dark-light pixels of the regional image further includes:
    averaging the lighting color values of all non-dark-light pixels in the regional image, and using the average value as the lighting color value corresponding to the main color tone; or
    averaging the lighting color values of all non-dark-light pixels and averaging the lighting color values of all dark-light pixels in the regional image, and weighting the two average values according to preset weights to obtain the lighting color value corresponding to the main color tone.

4. The lighting control method for an ambient lighting device according to claim 1, wherein the generating the lighting color value corresponding to each lamp bead in the unit frame corresponding to the regional image according to the lighting color value corresponding to the main color tone further includes:
    setting the lighting color value corresponding to the main color tone as the lighting color value of each lamp bead covered by the unit frame corresponding to the regional image; or
    according to a lighting color value of the main color tone adopted by another unit frame adjacent to a current unit frame corresponding to the regional image, gradually adjusting the lighting color value of each lamp bead covered by the current unit frame, such that a lighting color value gradient change relationship is formed between each lamp bead in the current unit frame along a direction toward the another unit frame.

5. The lighting control method for an ambient lighting device according to claim 1, wherein, after reading the environmental reference image captured by the camera, the method further includes:
    calculating frame difference information between a currently read environmental reference image and an environmental reference image read in the previous frame;

calculating a color tone change between two frames of the environmental reference images according to the frame difference information; and determining whether the color tone change reaches a preset change threshold; when the change threshold is reached, continuing subsequent processing; otherwise, terminating the subsequent processing, and continuing to iteratively read environmental reference images captured by the camera.

6. The lighting control method for an ambient lighting device according to claim 1, wherein, before generating a lighting color value corresponding to each lamp bead in the unit frame corresponding to the regional image according to the lighting color value corresponding to the main color tone, the method further includes:

determining whether the lighting color value corresponding to the main color tone of the regional image belongs to a first color value range corresponding to a preset blind-spot color, and when the lighting color value belongs to the first color value range, transforming the lighting color value corresponding to the main color tone to a second color value range corresponding to another color.

7. An ambient lighting device comprising a controller, an ambient lamp, and a camera, wherein the controller includes a central processing unit and a memory, the ambient light includes at least one light strip, the luminous light strip includes a plurality of lamp beads, the plurality of lamp beads are arranged into a display frame, the camera is used to capture an environmental reference image, and the central processing unit is used to call and run a computer program stored in the memory to execute a lighting control method, so as to control the lamp beads in the ambient lamp to emit light according to the environmental reference image, the method comprising:

starting the ambient lamp and the camera;

reading preset frame configuration information, and dividing the display frame into a plurality of unit frames according to the frame configuration information, such that each unit frame correspondingly covers multiple lamp beads in the ambient lamp;

reading the environment reference image, and dividing the environment reference image into a plurality of regional images corresponding to the plurality of unit frames according to the frame configuration information; and generating a lighting color value corresponding to each lamp bead in each unit frame, based on a main color tone of the regional image corresponding to the unit frame, and controlling the corresponding lamp beads covered by the unit frame with the lighting color value to emit light, wherein the generating the lighting color value corresponding to each lamp bead in each unit frame further includes:

distinguishing dark-light pixels and non-dark-light pixels in the regional image according to a preset dark-light threshold;

determining the lighting color value corresponding to the main color tone of the regional image according to a lighting color value of the non-dark-light pixels of the regional image; and generating the lighting color value corresponding to each lamp bead in the unit frame corresponding to the regional image according to the lighting color value corresponding to the main color tone.

8. The ambient lighting device according to claim 7, wherein the distinguishing dark-light pixels and non-dark-light pixels in the regional image according to a preset dark-light threshold further includes:

traversing lighting color values of each pixel in the regional image, and marking pixels whose lighting color values of a corresponding proportion are lower than a preset dark-light threshold as the dark-light pixels according to the preset ratio threshold; and marking pixels other than the dark-light pixels in the regional image as the non-dark-light pixels.

9. The ambient lighting device according to claim 7, wherein the determining the lighting color value corresponding to the main color tone of the regional image according to a lighting color value of the non-dark-light pixels of the regional image further includes:

averaging the lighting color values of all non-dark-light pixels in the regional image, and using the average value as the lighting color value corresponding to the main color tone; or averaging the lighting color values of all non-dark-light pixels and averaging the lighting color values of all dark-light pixels in the regional image, and weighting the two average values according to preset weights to obtain the lighting color value corresponding to the main color tone.

10. The ambient lighting device according to claim 7, wherein the generating the lighting color value corresponding to each lamp bead in the unit frame corresponding to the regional image according to the lighting color value corresponding to the main color tone further includes:

setting the lighting color value corresponding to the main color tone as the lighting color value of each lamp bead covered by the unit frame corresponding to the regional image; or according to a lighting color value of the main color tone adopted by another unit frame adjacent to a current unit frame corresponding to the regional image, gradually adjusting the lighting color value of each lamp bead covered by the current unit frame, such that a lighting color value gradient change relationship is formed between each lamp bead in the current unit frame along a direction toward the another unit frame.

11. The ambient lighting device according to claim 7, wherein, after reading the environmental reference image captured by the camera, the method further includes:

calculating frame difference information between a currently read environmental reference image and an environmental reference image read in the previous frame;

calculating a color tone change between two frames of the environmental reference images according to the frame difference information; and determining whether the color tone change reaches a preset change threshold; when the change threshold is reached, continuing subsequent processing; otherwise, terminating the subsequent processing, and continuing to iteratively read environmental reference images captured by the camera.

12. The ambient lighting device according to claim 7, wherein, before generating a lighting color value corresponding to each lamp bead in the unit frame corresponding to the regional image according to the lighting color value corresponding to the main color tone, the method further includes:

determining whether the lighting color value corresponding to the main color tone of the regional image belongs to a first color value range corresponding to a preset blind-spot color, and when the lighting color value belongs to the first color value range, transforming the lighting color value corresponding to the main color tone to a second color value range corresponding to another color.

13. A non-transitory computer-readable storage medium storing a computer program of computer-readable instructions for, when the computer program is called and executed by a computer device, implementing a lighting control method for an ambient lighting device, and the method comprising:
   starting an ambient lamp and a camera, wherein the ambient lamp includes at least one lighting strip, the lighting strip includes a plurality of lamp beads, and the plurality of lamp beads are arranged into a display frame;
   reading preset frame configuration information, and dividing the display frame into a plurality of unit frames according to the frame configuration information, such that each unit frame correspondingly covers multiple lamp beads in the ambient lamp;
   reading an environment reference image captured by the camera, and dividing the environment reference image into a plurality of regional images corresponding to the plurality of unit frames according to the frame configuration information; and
   generating a lighting color value corresponding to each lamp bead in each unit frame, based on a main color tone of the regional image corresponding to the unit frame, and controlling the corresponding lamp beads covered by the unit frame with the lighting color value to emit light,
   wherein the generating the lighting color value corresponding to each lamp bead in each unit frame further includes:
   distinguishing dark-light pixels and non-dark-light pixels in the regional image according to a preset dark-light threshold;
   determining the lighting color value corresponding to the main color tone of the regional image according to a lighting color value of the non-dark-light pixels of the regional image; and
   generating the lighting color value corresponding to each lamp bead in the unit frame corresponding to the regional image according to the lighting color value corresponding to the main color tone.

14. The non-transitory computer-readable storage medium according to claim 13, wherein the distinguishing dark-light pixels and non-dark-light pixels in the regional image according to a preset dark-light threshold further includes:
   traversing lighting color values of each pixel in the regional image, and marking pixels whose lighting color values of a corresponding proportion are lower than a preset dark-light threshold as the dark-light pixels according to the preset ratio threshold; and
   marking pixels other than the dark-light pixels in the regional image as the non-dark-light pixels.

15. The non-transitory computer-readable storage medium according to claim 13, wherein the determining the lighting color value corresponding to the main color tone of the regional image according to a lighting color value of the non-dark-light pixels of the regional image further includes:
   averaging the lighting color values of all non-dark-light pixels in the regional image, and using the average value as the lighting color value corresponding to the main color tone; or
   averaging the lighting color values of all non-dark-light pixels and averaging the lighting color values of all dark-light pixels in the regional image, and weighting the two average values according to preset weights to obtain the lighting color value corresponding to the main color tone.

16. The non-transitory computer-readable storage medium according to claim 13, wherein the generating the lighting color value corresponding to each lamp bead in the unit frame corresponding to the regional image according to the lighting color value corresponding to the main color tone further includes:
   setting the lighting color value corresponding to the main color tone as the lighting color value of each lamp bead covered by the unit frame corresponding to the regional image; or
   according to a lighting color value of the main color tone adopted by another unit frame adjacent to a current unit frame corresponding to the regional image, gradually adjusting the lighting color value of each lamp bead covered by the current unit frame, such that a lighting color value gradient change relationship is formed between each lamp bead in the current unit frame along a direction toward the another unit frame.

17. The non-transitory computer-readable storage medium according to claim 13, wherein, after reading the environmental reference image captured by the camera, the method further includes:
   calculating frame difference information between a currently read environmental reference image and an environmental reference image read in the previous frame;
   calculating a color tone change between two frames of the environmental reference images according to the frame difference information;
   determining whether the color tone change reaches a preset change threshold; when the change threshold is reached, continuing subsequent processing; otherwise, terminating the subsequent processing, and continuing to iteratively read environmental reference images captured by the camera.

18. The non-transitory computer-readable storage medium according to claim 13, wherein, before generating a lighting color value corresponding to each lamp bead in the unit frame corresponding to the regional image according to the lighting color value corresponding to the main color tone, the method further includes:
   determining whether the lighting color value corresponding to the main color tone of the regional image belongs to a first color value range corresponding to a preset blind-spot color, and when the lighting color value belongs to the first color value range, transforming the lighting color value corresponding to the main color tone to a second color value range corresponding to another color.

* * * * *